Patented Apr. 28, 1953

2,636,827

UNITED STATES PATENT OFFICE 2,636,827

REFRACTORY MATERIAL AND PROCESS

Paul Lanser and Norbert Skalla, Radenthein, Austria, assignors to General Refractories Company, Philadelphia, Pa.

No Drawing. Application February 16, 1952, Serial No. 271,981. In Austria January 20, 1951

4 Claims. (Cl. 106—59)

The present invention relates to a non-acid refractory material produced by cofusing magnesia and chromite.

A purpose of the invention is to obtain a non-acid refractory material of higher resistance to changes in temperature.

A further purpose is to increase the refractoriness under load of non-acid refractory material.

A further purpose is to secure improved mechanical strength of non-acid refractory material.

A further purpose is to reduce the iron content of a refractory made from chromite.

A further purpose is to remove silica or lime as the case may be from a non-acid refractory material.

Further purposes appear in the specification and in the claims.

It is known that fused magnesia produced by fusion of magnesite (raw magnesite, burned magnesia or sintered magnesia) in an electric furnace possesses particularly valuable properties for the making of refractory bricks. Owing to their constancy of volume and density, bricks produced from fused magnesia which are used in the lining of open hearth steel furnaces, especially to parts exposed to heavy wear, show high durability and resistance to slag attack. The resistance to changes of temperature of such brick produced from fused magnesia is generally sufficient although an improvement in this property is desirable.

When producing refractory brick from burned magnesia, it is possible to increase the resistance to changes in temperature and at the same time to retain sufficient mechanical strength by using a certain grain size relationship, and by addition of alumina or aluminiferous materials such as fired clay, chamotte and the like (Austrian Patent 158,208). Chromite has also been added to burned magnesia in the brick mix to improve the properties of refractory bricks. By the addition of aluminiferous materials to magnesia it is not possible to obtain any considerable improvement of brick produced because the refractoriness under load is considerably decreased. Refractory bricks consisting of magnesia with an addition of chrome ore (chromite) have a low cold crushing strength.

Fused products are also known in the art which contain magnesia and are low in lime and silica, and which contain a major part of chromic oxide and/or alumina and a minor amount of magnesia. British Patent 621,736 describes a method for the production of a mass which is fused and then cast into bricks, whereby the sum of the mol concentrations of $Cr_2O_3$ plus $Al_2O_3$ amounts to 80 to 120% of the total MgO plus FeO content, so that for one part by weight of MgO plus FeO, 1.81 to 2.72 parts by weight of $Cr_2O_3$ plus $Al_2O_3$ are taken, so that the FeO content amounts to at least 8%, the MgO content to not less than 1.5%, the $Cr_2O_3$ content to at least 11% and the $Al_2O_3$ content lies between 5 and 50%, the mol ratio of MgO to FeO being 0.089 to 4.1%. These molten products contain between 1.5 and 21% magnesia.

In United States Patent 2,271,364 refractory bricks are proposed made from fused magnesia, the bricks being largely free from silica, and containing 5 to 25% iron oxide, 10 to 45% alkaline earth oxide such as MgO, CaO, SrO or BaO, the remainder being $Cr_2O_3$. A brick with 10% MgO is mentioned as an example for bricks containing magnesia. Cast refractory material with a content of approximately 75% $Cr_2O_3$ and at the most 25% MgO, which can be substituted by other alkaline earth oxides is described in United States Patent 2,271,362, the typical composition being 76% $Cr_2O_3$, 15% CaO and 9% MgO.

The present inventors have discovered that an improved refractory material can be obtained by comelting a mixture consisting chiefly of magnesia, with a similar amount of chrome ore (chromite) and preferably with the addition of lime bearing material as later explained.

The magnesia will in some cases be incorporated in the mixture as raw magnesite, while in other cases it will be employed as burned magnesia or sintered magnesia, such as dead burned magnesite.

The chromite may be employed in the form of any of the refractory grades of chromite.

The refractory material made by comelting the magnesia and chromite as later explained can be employed in refractory brick in any of the usual ways in which magnesia and chromite are now employed, binding with any of the usual organic or inorganic binding agents. Where the silica and lime content of the refractory material of the invention are below specified limits as later explained, refractory brick employing the new refractory material of the present invention have a surprisingly high resistance to changes in temperature, resulting in excellent refractoriness under load and having satisfactory mechanical strength.

The invention is therefore concerned with a refractory material for the manufacture of refractory brick, ramming masses, linings and the like consisting of a comelted product of magnesia and chromite. The product of the invention has a magnesia content at least 56% and preferably between about 70 and 85%, and a content of $Cr_2O_3$ making up the balance of the refractory material except for impurities, and preferably between 5 and 15% of $Cr_2O_3$.

The silica content of the refractory material of the invention should not exceed 3% and preferably not exceed 2.5%, in order that the material shall exhibit high resistance to changes in temperature. Likewise for the same reason the lime content of the refractory material of the invention should not exceed 3% and preferably not exceed 2.5%.

The following are examples of the composition of the refractory material produced in accordance with the present invention, after melting, solidifying and crushing:

|  | A | B | C | D |
|---|---|---|---|---|
| $SiO_2$ | 2.21 | 2.17 | 1.71 | 2.09 |
| $Fe_2O_3$ | 3.65 | 6.77 | 3.83 | 9.79 |
| $Al_2O_3$ | 2.11 | 2.19 | 3.84 | 3.48 |
| $Cr_2O_3$ | 6.79 | 6.77 | 7.15 | 13.00 |
| CaO | 2.45 | 2.30 | 1.86 | 1.90 |
| MgO | 82.79 | 78.20 | 79.61 | 69.74 |
| Ignition Loss | 0.00 | 0.00 | 0.00 | 0.00 |

For many purposes it is highly important to reduce the content of lime and silica in the refractory material according to the invention, and this can be done very effectively by adding lime-bearing material or silica-bearing material as the case may be and removing dicalcium silicate. According to the preferred procedure 80 to 90 parts by weight of burned magnesia is mixed with 10 to 20 parts by weight of chromite. Knowing the analysis of the magnesia and the chromite and allowing for all lime and silica present in the magnesia and chromite, lime-bearing material such as lime, or lime-bearing magnesia or dolomite is added if there is too little lime or on the other hand silica or silicates such as ganister are added if there is too little silica, to bring the composition of the mixture to approximately that which corresponds to the composition of dicalcium silicate ($2 CaO.SiO_2$), so that the total lime and silica present will conform to this composition.

The mixture of magnesia and chromite as specified, with the added lime or silica as the case may be, is melted suitably under the electric carbon arc applied at a point near the center of a mass of grains of the mixture, so as to fuse the mixture in an envelope consisting of the grains of the mixture. Dicalcium silicate forming in the melt segregates at the outside of the melt in the form of a crust, freeing the melt from all of the silica compounds except a small residual quantity of silica. After the melt solidifies to form a fused block, the dicalcium silicate at the outside decomposes into a powder. Surprisingly the known stabilizing effect of chromic oxide which prevents the disintegration of dicalcium silicate under other conditions does not occur when slow cooling is employed. Thus by this procedure the melt is purified from dicalcium silicate without great effort.

The fusion is preferably carried out under the electric carbon arc using one of the procedures in which the melt is continuously carried away from the zone of melting, as is familiar in the usual practice in fusing refractory materials. For this purpose a well known electric furnace is preferred in which the electrodes are placed in a melting hearth which is continuously fed with the mixture to be fused and the body of which rotates around a horizontal axis.

The mass to be melted preferably consists of rather coarse magnesia particles in the range up to 15 mm. often designated as 0 to 15 mm., and preferably in the range from 3 to 15 mm., and relatively fine chromite particles under 1 mm. and preferably under 0.5 mm. The fine chromite distributes more uniformly through the magnesia than does coarse chromite.

It is of special importance in obtaining the best properties for the product of the invention that the silica content of the chromite is decreased by the process, thus reducing the easily fusible material which lowers the refractoriness of the refractory material.

The refractory material produced according to the invention, after slow cooling and solidifying and suitably separating from the dicalcium silicate, is crushed and milled to uniform particles in the usual manner, producing the required grain sizes for refractory bricks, ramming masses, linings or the like. The brick produced can be used in either burned or unburned condition. For example brick produced according to the invention having grain size of 2 to 4 mm. showed no cracks even after 125 chills. This is highly unusual. The $t_e$ - point (total softening point) according to Deutsche Industrie Norm 1064 of the brick produced with a refractory material of the invention was over 1700° C. and the cold crushing strength of the brick produced with a refractory material of the invention according to Deutsche Industrie Norm 1067 was 160 to 200 kilograms per square centimeter, a satisfactory value. The high resistance to change in temperature of the refractory material of the invention was proved by the fact that brick produced from the same without the employment of special grain size techniques stood up to 11 chills, while ordinary magnesite brick break after from 1 to 3 chills.

Brick produced from refractory material according to the invention are suitable for lining of open hearth steel furnaces especially in very exposed parts such as front and back walls, burners and ends. Owing to the high resistance to changes in temperature, brick produced from the new refractory material of the invention are very useful for cover brick in electric furnaces which are required to have a high resistance to change in temperature. Owing to the fact that the reduction of magnesium chromite $$(MgO-Cr_2O_3)$$

is rendered far more difficult than the reduction of chromite ($FeO-Cr_2O_3$), these brick with a low $Cr_2O_3$ content are generally suitable as linings for furnaces melting special steels. Furthermore, since the proportion of picrochromite (magnesium chromite) is low, damage caused by absorption of iron (bursting) is less frequent than with chrome-magnesite brick. The new refractory material of the invention is most suitable for the production of brick for electric furnaces, which are of various shapes owing to the fact that no extremely coarse sizes are necessary to obtain the required resistance to changes of temperature.

As compared to the melting of magnesite, the electric fusion of magnesia with chromite is much easier and the kilowatt consumption per ton is less.

Example

The batch used for melting contained 60% by weight of burned magnesia analyzing:

| | Per cent |
|---|---|
| SiO$_2$ | 2.83 |
| Fe$_2$O$_3$ | 4.40 |
| Al$_2$O$_3$ | 1.40 |
| Cr$_2$O$_3$ | 0.00 |
| CaO | 4.20 |
| MgO | 87.17 |
| Ignition loss | 0.00 |
| | 100.00 | which was mixed with 25% by weight of burned magnesia rich in lime or waste from the magnetic dressing of burned magnesia analyzing:

| | Per cent |
|---|---|
| SiO$_2$ | 2.30 |
| Fe$_2$O$_3$ | 5.00 |
| Al$_2$O$_3$ | 1.40 |
| Cr$_2$O$_3$ | 0.00 |
| CaO | 10.60 |
| MgO | 80.70 |
| Ignition loss | 0.00 |
| | 100.00 | and 15% by weight of fine chrome ore analyzing:

| | Per cent |
|---|---|
| SiO$_2$ | 6.45 |
| Fe$_2$O$_3$ | 15.75 |
| Al$_2$O$_3$ | 13.22 |
| Cr$_2$O$_3$ | 48.07 |
| CaO | 0.67 |
| MgO | 15.84 |
| Ignition loss | 0.00 |
| | 100.00 |

The resulting mix before fusing had the following analysis:

| | Per cent |
|---|---|
| SiO$_2$ | 3.34 |
| Fe$_2$O$_3$ | 6.25 |
| Al$_2$O$_3$ | 3.17 |
| Cr$_2$O$_3$ | 7.21 |
| CaO[1] | 5.27 |
| MgO | 74.76 |
| Ignition loss | 0.00 |
| | 100.00 |

[1] $\frac{CaO}{SiO_2} = 1.57$

After fusing in a continuous electric carbon arc furnace which continuously withdraws the melt such as a Horry furnace, the final fused product after solidification, separation from dicalcium silicate and crushing had the following composition:

| | Per cent |
|---|---|
| SiO$_2$ | 2.03 |
| Fe$_2$O$_3$ | 3.71 |
| Al$_2$O$_3$ | 2.19 |
| Cr$_2$O$_3$ | 7.08 |
| CaO | 2.50 |
| MgO | 82.49 |
| | 100.00 |

It will be noted that 39% of the silica was removed and 52% of the lime was removed by the purification effect of the fusion. The electric carbon arc also decreased the iron content by refining and evaporation of metallic iron, so that the resulting product is substantially purer than the mix from which it was obtained.

All of the percentages given herein are percentages by weight.

In view of our invention and disclosure variations and modifications to meet individual wish or particular need will doubtless become evident to others skilled in the art, to obtain all or part of the benefits of our invention without copying the process and composition shown, and we, therefore, claim all such insofar as they fall within the reasonable spirit and scope of our invention.

Having thus described our invention what we claim as new and desire to secure by Letters Patent is:

1. The method of making a non-acid refractory material, which comprises mixing together magnesia and chromite in a ratio of about 80 to 90 parts by weight of magnesia to 10 to 20 parts by weight of chromite, in the case where silica is in excess of the composition of dicalcium silicate adding lime-bearing material in quantities sufficient to adjust the total lime-silica ratio in the mixture to that approximately corresponding to the composition of dicalcium silicate, in the case where lime is in excess of the composition of dicalcium silicate adding silica-bearing material in quantities sufficient to adjust the total lime silica ratio in the mixture to that approximately corresponding to the composition of dicalcium silicate, fusing the mixture, and thereby depositing dicalcium silicate at the edge of the melt, allowing the mass to cool slowly and solidify, separating the dicalcium silicate and crushing the cofused magnesia and chromite into particles.

2. The method of making a non-acid refractory material, which comprises mixing together from 80 to 90 parts by weight of magnesia of a particle size of 3 to 15 mm. and 10 to 20 parts by weight of chromite of a particle size below 1 mm., in the case where silica is in excess of the composition of dicalcium silicate adding lime-bearing material in quantities sufficient to adjust the total lime-silica ratio in the mixture to that approximately corresponding to the composition of dicalcium silicate, in the case where lime is in excess of the composition of dicalcium silicate adding silica-bearing material in quantities sufficient to adjust the total lime-silica ratio in the mixture to that approximately corresponding to the composition of dicalcium silicate, fusing the mixture and thereby depositing dicalcium silicate at the outside of the melt, allowing the melt to cool slowly and solidify, removing the dicalcium silicate, and crushing the material into particles.

3. The method of making a non-acid refractory material, which comprises mixing magnesia and chromite in proportions which produce from about 70 to 85% of MgO and from about 5 to 15% of Cr$_2$O$_3$ in the final product, in the case where silica is in excess of the composition of dicalcium silicate adding lime-bearing material in quantities sufficient to adjust the total lime-silica ratio in the mixture to that approximately corresponding to the composition of dicalcium silicate, in the case where lime is in excess of the composition of dicalcium silicate adding silica-bearing material in quantities sufficient to adjust the total lime-silica ratio in the mixture to that approximately corresponding to the composition of dicalcium silicate, fusing the mixture in an electric carbon arc and thereby volatilizing iron and depositing dicalcium silicate at the outside of the melt, allowing the melt to cool slowly and solidify, separating the melt from the dicalcium silicate and crushing the material into particles.

4. The method of making a non-acid refractory material, which comprises mixing together magnesia and chromite in proportions which produce from about 70 to 85% of MgO and from 5 to 15% of $Cr_2O_3$ in the final product, in the case where silica is in excess of the composition of dicalcium silicate adding lime-bearing material in quantities sufficient to adjust the total lime-silica ratio in the mixture to that approximately corresponding to the composition of dicalcium silicate, in the case where lime is in excess of the composition of dicalcium silicate adding silica-bearing material in quantities sufficient to adjust the total lime-silica ratio in the mixture to that approximately corresponding to the composition of dicalcium silicate, fusing the mixture in an electric carbon arc and thereby volatilizing iron and depositing dicalcium silicate at the outside of the melt, continuously withdrawing the melt relatively away from the electric arc and thereby allowing the melt to cool slowly and solidify, separating the solidified material from the dicalcium silicate and crushing the separated material into particles.

PAUL LANSER.
NORBERT SKALLA.

References Cited in the file of this patent

FOREIGN PATENTS

| Number | Country | Date |
|---|---|---|
| 608,790 | Great Britain | 1948 |
| 577,932 | Germany | 1933 |
| 580,491 | Germany | 1933 |